United States Patent [19]

Tsong et al.

[11] Patent Number: 5,606,339
[45] Date of Patent: Feb. 25, 1997

[54] METHOD AND APPARATUS FOR CONTROLLING THE COLOR SATURATION OF A COLOR MONITOR

[75] Inventors: Danny Tsong, Taipei; Timothy Chiu, Tao Yuan Hsien; Johnson Chiang, Nan Tou Hsien, all of Taiwan

[73] Assignee: Texas Instruments Incorporated, Dallas, Tex.

[21] Appl. No.: 234,895

[22] Filed: Apr. 28, 1994

[51] Int. Cl.$^6$ ................................................. G09G 1/28
[52] U.S. Cl. .......................... 345/22; 345/150; 345/154
[58] Field of Search .................................. 345/150, 151, 345/152, 153, 154, 155, 22

[56] References Cited

U.S. PATENT DOCUMENTS

| | | | |
|---|---|---|---|
| 4,183,046 | 1/1980 | Dalke et al. | 345/154 |
| 4,553,141 | 11/1985 | Flasza et al. | 345/22 |
| 4,719,503 | 1/1988 | Craver et al. | 345/22 |

Primary Examiner—Raymond J. Bayerl
Assistant Examiner—Matthew Luu
Attorney, Agent, or Firm—W. James Brady, III; Richard L. Donaldson

[57] ABSTRACT

An amplifier (10) and method for controlling a saturation level of a color video signal has a circuit (33) connected to sum respective individual input color video signals to provide a summed output video signal (34). A first amplifier (14) receives one of the individual color video signals (R) as an input and produces an amplified individual color video signal output (15). A second amplifier (30) receives the summed output video signal (34) and produces a reference output signal (35), connected to be added to the amplified individual color video signal output (15). A user adjustable color saturation control circuit (25) controls a gain of the second amplifier (30), and inversely controls a gain of the first amplifier (14). In one embodiment, a contrast control circuit (20) is connected to control the gain of the first amplifier (14) with the user adjustable color saturation control circuit (25) being connected to the contrast control circuit (20) to control the gain of the first amplifier (14).

24 Claims, 3 Drawing Sheets

METHOD AND APPARATUS FOR CONTROLLING THE COLOR SATURATION OF A COLOR MONITOR

BACKGROUND OF THE INVENTION

1. Field of the Invention

This invention relates to improvements in color monitors, and more particularly to improvements in methods and apparatus for controlling the color saturation of a color monitor.

2. Relevant Background

In the past, personal computer users have experienced frustration with color displays or monitors that have provided only image brightness and contrast controls, but provided no control to change or adjust the color saturation of the image. The brightness of an image refers to the luminance of the image apart from its hue or saturation, whereas contrast refers to the brightness ratio of the lightest to the darkest part of the image. The saturation of a color of an image refers to the degree of chroma or purity of the color, or the degree of freedom from admixture with white.

Often with many modern software programs, the saturation of the color may need to be modified, but no control is provided to accomplish such change or adjustment. Although the television display art may appear relevant, since television monitors often include a color saturation control, major differences exist. This may be due in part to the differences in the ways that video signals are processed by television monitors and color monitors used with personal computers or the like. For ease of description, standard color television monitors and receivers of the type in which four video signals are supplied or derived, including a black and white luminance signal, and at least two color difference signals that are processed with the luminance signal to produce a composite video signal, are referred to herein as "television monitors". Color monitors used in applications such as personal computer displays, or the like, of the type in which three color video signals are supplied and individually displayed on a screen or other display device without the presence of a separate black and white luminance signal, are referred to as "color monitors".

In contrast to color monitors widely known in the computer industry, television monitors typically process video signals that are transmitted as a composite video signal that has a luminance, or black and white, signal that is combined with a chromanance signal. The separate luminance signal is required to enable the signal to be viewable on black and white television receivers. The presence of both luminance and chromanance signals makes the provision of a color saturation control desirable, and easily providable.

However, color monitors do not require the separate luminance signal, and, as mentioned, typically do not have a separate color saturation control. This often results in colors being distorted, being displayed as the wrong color, or masking information to be displayed, especially if the hues of adjacent colors are close. As an example, if a red background had maroon letter displayed on it, and the saturation of the colors were too high, conceivably, the colors would all display the same, and the letters could not be discerned from the background.

In accomplishing such color saturation control in television monitors, generally two signals, a video signal and a chroma signal, are provided. The video signal represents essentially a black and white picture. The chroma signal provides color to the video signals generally and is typically made up of three color signals, red (R), blue (B) and green (G). The color signals are usually repressed as a color difference between a color component signal and the video signal. Thus, one or more of the color difference signals may be derived at the receiver if a sufficient number of the other color signals are known.

On the other hand, in typical color monitors used in personal computers, or similar applications, the signals needed to drive the monitor are merely the three color signals unaccompanied by a separate black and white video signal. Thus, the standard video solution is inapposite to providing color saturation control in color monitors, or the like.

BRIEF DESCRIPTION OF THE DRAWINGS

The invention is illustrated in the accompanying drawings, in which.

SUMMARY OF THE INVENTION

Figure 1:
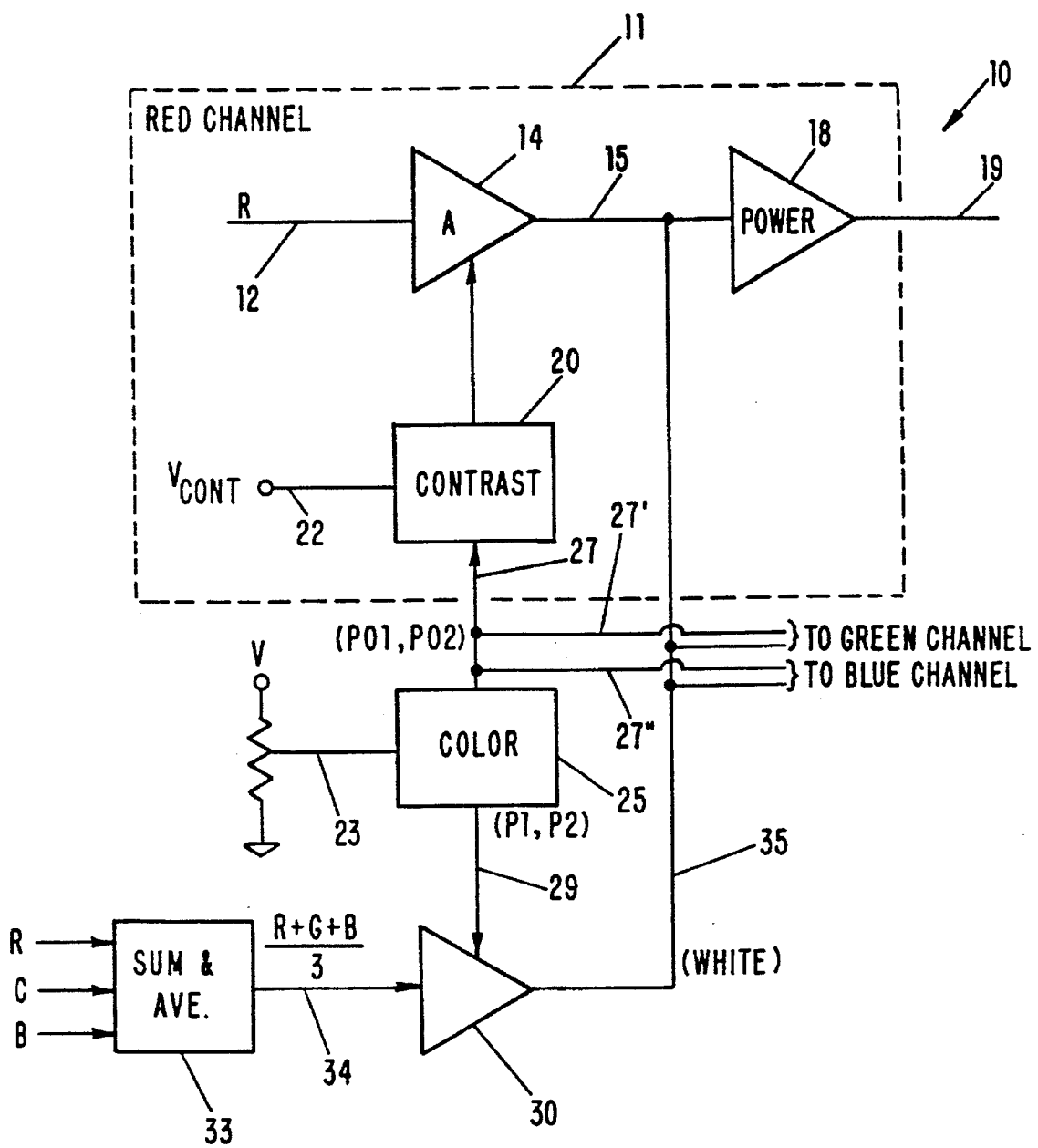
FIG. 1 is a block diagram of a portion of an electrical circuit for controlling the color saturation of a color monitor of the type in which three color signals are applied, in accordance with a preferred embodiment of the invention, showing functionally the manner by which the color saturation control serves to modify the saturation of the output signal in a red video signal channel.

In light of the above, it is, therefore, an object of the invention to provide an improved video preamplifier.

It is an object of the invention to provide a single chip video preamplifier having color saturation control.

It is another object of the invention to provide an accurate color control that can optimize the saturation degree on present color monitors.

These and other objects, features and advantages of the invention will be apparent to those skilled in the art from the following detailed description of the invention, when read in conjunction with the accompanying drawings and appended claims.

A preferred method by which this invention is accomplished is by mixing the red (R), green (G). and blue (B) input signals, and dividing the mixed signal by three. This forms a fourth signal, referred to herein as a "Y" signal. The "Y" signal is, in essence, the average value of the color signals, and should not be confused with the "Y" signal used in television signal processing applications. The original R, G. B signals are the processed into the actual video output, each weighted by the average signal "Y" to an extent determined by the user.

Thus, In accordance with a broad aspect of the invention, a preamplifier for providing color video signals for application to a color monitor is presented. The preamplifier has a summing circuit connected to combine respective individual color video signals to provide a combined output video signal. A plurality of amplifier channels are each connected to receive as inputs respective individual color video signals. Each amplifier channel has a first amplifier for receiving as input one of the color video signals for producing an amplified color video signal output, and a contrast control circuit connected to control the gain of the first amplifier. A second amplifier is connected to receive the combined output video signal from the summing circuit for producing a white level output signal to produce an output that is connected to be added to the amplified video signal outputs of the first amplifiers to produce respective color output signals. A user adjustable color saturation control circuit is connected to control a gain of the second amplifier, and to control the contrast control circuit inversely to the gain of the second amplifier, In a preferred embodiment, the plurality of amplifier channels are three in number, connected to receive respectively red, green, and blue video signal information. Each of the amplifier channels may also have an output stage connected to receive the respective color output signals for application to the color monitor.

In accordance with another broad aspect of the invention, an amplifier for color video signals for application to a color monitor is presented. The amplifier has a circuit connected to sum respective individual input color video signals to provide a summed output video signal. A first amplifier receives one of the individual color video signals as an input and produces an amplified individual color video signal output. A second amplifier receives the summed output video signal and produces a reference output signal, connected to be added to the amplified individual color video signal output. A user adjustable color saturation control circuit controls a gain of the second amplifier, and inversely controls a gain of the first amplifier. In one embodiment, a contrast control circuit is connected to control the gain of the first amplifier with the user adjustable color saturation control circuit being connected to the contrast control circuit to control the gain of the first amplifier.

In accordance with yet another broad aspect of the invention, an amplifier is presented for controlling a color saturation level of a multi-color video signal. The amplifier has a first amplifier for receiving one of the individual color video signals as an input and for producing an amplified individual color video signal output. A circuit is connected to sum respective individual input color video signals to provide a summed output video signal. A second amplifier is connected to receive the summed output video signal for producing a reference output signal, connected to be added to the amplified individual color video signal output, and a user adjustable color saturation control circuit connected to control a gain of the second amplifier, and to inversely control a gain of the first amplifier.

In accordance with still another broad aspect of the invention, a method is presented for controlling a color saturation level of a multi-color video signal. The method includes amplifying one of the individual color video signals by a first gain to produce an amplified individual color video signal output, summing individual input color video signals to provide a summed output video signal, amplifying the summed output video signal by a second gain to produce a reference output signal, adding the reference output signal to the amplified individual color video signal output, and inversely varying the first and second gains in dependence upon a desired color saturation level.

DETAILED DESCRIPTION OF THE PREFERRED EMBODIMENTS

A block diagram illustrating the manner by which the saturation of a color monitor signal is controlled according to the invention is shown in FIG. 1. The saturation control circuit 10 includes a number of color processing channels, such as the red channel 11 shown. In a typical color monitor system, for example, three colors are popularly used, red, green, and blue. It will be understood, of course, that other color systems besides the popularly used red, green, and blue color system may be employed in conjunction with the operation of the circuit of the invention. Moreover, the principles of operation can be equally advantageously employed in color systems that use color combination principles other than a three color system, two or four colors, for example, being known and used, but not presently receiving widespread acceptance or use.

In the circuit embodiment shown, although only the red channel 11 is shown, it will be understood that similar green and blue channels would be provided, connected in a similar fashion, to deliver output signals to the red, green, and blue electron guns of a CRT or red, green, and blue signal processing paths of other types of information display, well known in the art.

The red input signal is delivered on an input line 12 to an amplifier 14 having a gain A. The output from the output stage 14 is delivered on a line 15 to a power amplifier 18. The output from the power amplifier 18 is delivered on line 19 for use in creating the red portion of the color display. The contrast of the red signal is controlled by a contrast controlling circuit 20, which varies the gain of the amplifier 14 in accordance with a contrast control signal, provided, for example, by a voltage $V_{CONT}$ applied to a terminal 22.

In accordance with the invention, a color saturation control signal is employed, developed, for example, by a color saturation control circuit 25 in response to a user controlled voltage on an input line 23. (Although the term "user controlled" is used herein to denote both the contrast and saturation input signals or voltages, it will be understood that the input signals or voltages may also be automatically generated by a computer, control system, or the like.) The color saturation control circuit 25 provides a first output signal on a line 27 to the contrast control circuit 20 to vary the gain of the amplifier 14 in dependence upon the value of the user controlled voltage on line 23 at the input to the color saturation control circuit 25. The output from the color saturation control circuit 25 is also connected to the contrast control circuits associated with the green and blue channels, respectively, on lines 27' and 27".

In addition, a second output from the color saturation control circuit 25 is connected to control the gain of a second amplifier circuit 30. It is noted, however, that the output from the color saturation control circuit 25 on line 27 is in opposite direction to that delivered on the output line 29. Thus, in the operation of the circuit, the gain of the amplifier 14 is adjusted in opposite direction or inversely proportionally to the gain of the amplifier 30 in dependence upon the adjustment made to the color saturation control circuit 25. The signal gain, appearing on line 15, for example, therefore remains substantially constant.

The input to the amplifier 30 is derived from a signal summing and averaging circuit 33. All three of the input signals, red, green, and blue in this case, are connected to inputs of the summing and averaging circuit 33, which adds the three signals together and divides the result by three. The summed and averaged signal is delivered on the line 34 to the input of the amplifier 30, and is weighted by being amplified by a gain dependent upon the signal from the color saturation control circuit 25 on line 29, as above described. The amplified signal is delivered on a line 35 that is connected to the input of the power amplifier 18 together with the output from the amplifier 14 that is delivered on the line 15.

It will be appreciated that the signal on line 35, being the averaged sum of the red, green, and blue input signals, is a white signal. Thus, depending upon the level of the white signal on the line 35 in proportion to the red signal on line 15 (and green and blue signals in the corresponding green and blue color channels) the color saturation of the signal amplified by the power amplifier 18 is adjustable by the user controlled voltage on the line 23 at the input of the color saturation circuit 25.

Figure 2A:
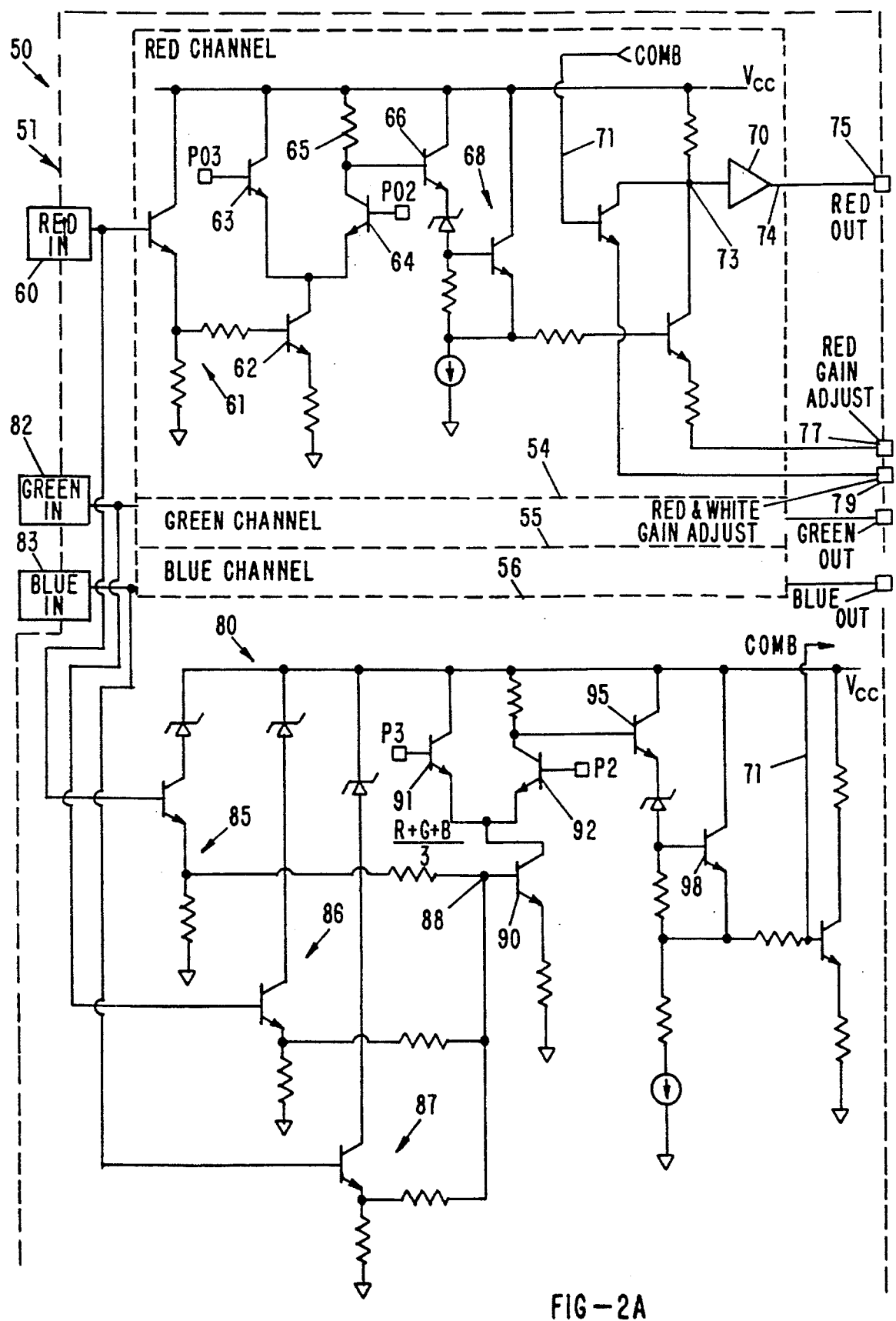
FIGS. 2a and 2b is an electrical schematic diagram of a circuit for controlling the color saturation of a color video signal, in the manner outlined in FIG. 1, for application to a color monitor, in accordance with a preferred embodiment of the invention.
Figure 2B:
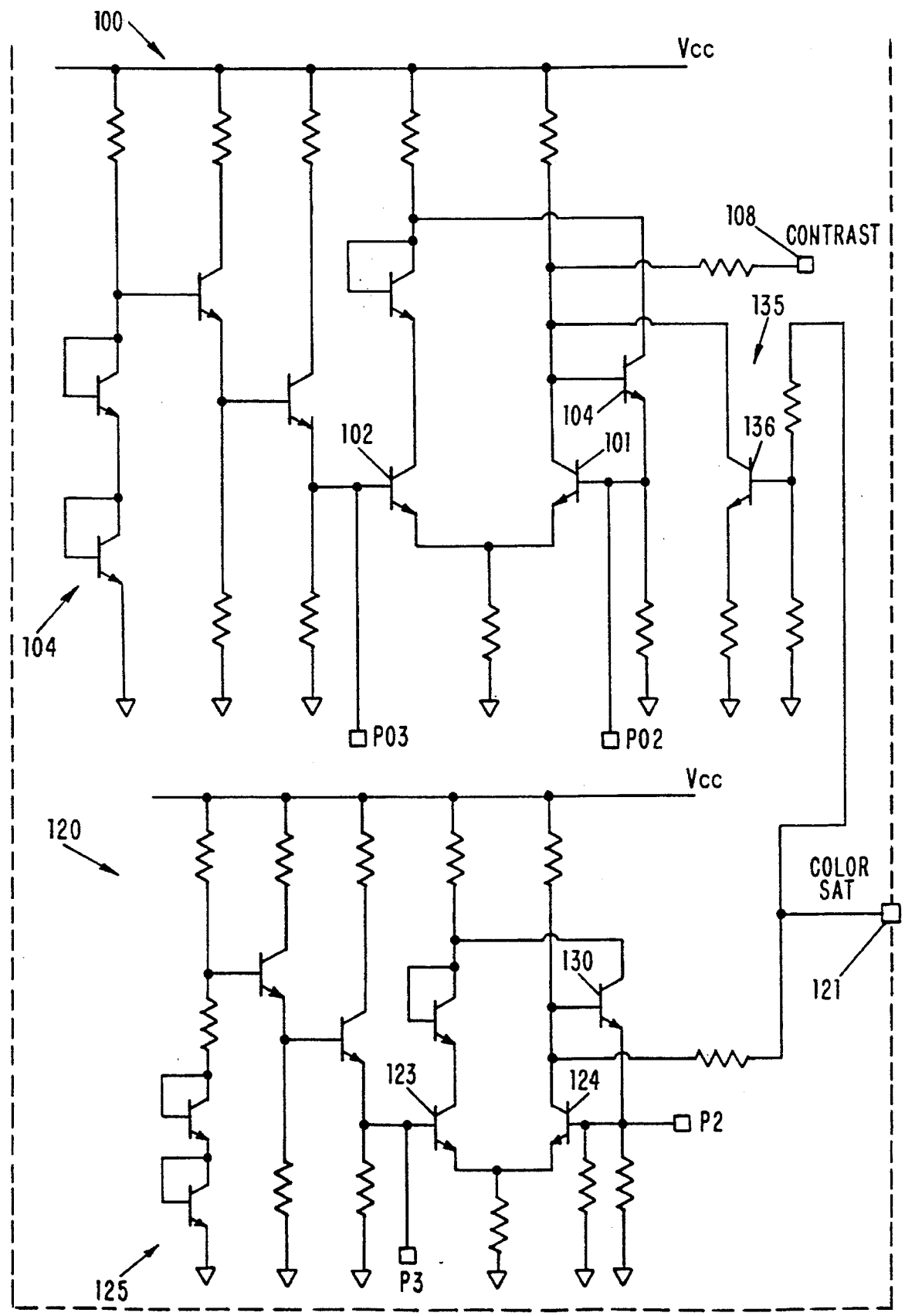

A detailed electrical schematic diagram showing one embodiment of a color saturation control circuit in accordance with the invention is shown in FIGS. 2A and 2B. The color saturation circuit 50 is constructed on an integrated circuit chip, denoted by the dotted line 51. Again, in the circuit 50 shown in FIGS. 2A and 2B, only the red channel circuit portion 54 of the circuit that processes and delivers the red channel signal is shown. It will be understood, of course, that similarly constructed green channel and blue channel circuits, denoted by dotted boxes 55 and 56 are provided in a complete signal processing circuit.

In the construction of the red channel circuit 54, an input pin 60 is provided to which an externally generated red video signal may be connected for amplification and processing by the circuit 50. The first amplifier stage to which the red input signal is applied is an emitter follower amplifier 61 that provides an input to an NPN transistor 62 that controls the overall current flowing in the differential amplifier defined by NPN transistors 63 and 64. The differential amplifier transistor 63 and 64 receive their base inputs respectively from terminals denoted P03 and P02, derived by the contrast control circuit below described in detail. Thus, depending upon the level of the contrast desired, the ratio of currents flowing through the NPN transistor 63 or 64 controls the voltage developed across the collector resistor 65 in the current path of the NPN transistor 64. This voltage is connected to the base of an amplifier transistor 66, the level of which is shifted by level shifting circuit 68 and applied to the input of an output amplifier 70. In addition, the combined, averaged, and saturation adjusted white level signal from the input signal summing and averaging circuit described below, is provided on a line 71 and applied also to the input of the amplifier 70 at the summing node 73.

The output signal, OUT$_{RED}$, from the amplifier 70 is derived on the output line 74 connected to an output pin 75 from the integrated circuit 50 for delivery to drive the video power amplifier. If desired, separate external gain adjustment pins 77 and 79 may be provided to which external trim resistors can be connected to respectively fine tune the red signal gain and the combined red+white signal gain.

The summed, averaged, and saturation adjusted combined signal on line 71 is derived by a circuit 80, shown in FIG. 2A. The circuit 80 receives its inputs from the respective red, green, and blue input pins 60, 82, and 83, representing the red, green, and blue input signals to the circuit.

The respective red, green, and blue input signals are connected to level shifting emitter follower transistor amplifier circuits 85, 86, and 87, the outputs of which are summed together on a common node 88. The value of the signal appearing on node 88, therefore, represents the sum of the red, green, and blue signals divided by three.

The signal appearing on the summing node 88 is connected to an NPN transistor 90 that controls the current in a differential amplifier that includes NPN transistors 91 and 92. Thus, the transistor 90 controls the total current flowing through the current paths through the NPN transistors 91 and 92. The ratio of the currents in the flow paths of the transistors 91 and 92 is controlled by the signals applied to terminals P2 and P3, derived from the color saturation control circuit described below in detail.

The output from the differential amplifier is connected to the amplifying transistor 95, which, in turn, is connected to deliver the output signal to the line 71 through the level shifting transistor 98. Since the gain of the differential amplifier has been controlled according to the saturation level signals at points P2 and P3, the output signal COMB on the line 71 represents the weighted, averaged white value of the red, green and blue input signals.

The contrast control circuit 100 that is used in conjunction with the color signal processing circuit of the invention is shown in FIG. 2B. The contrast control circuit includes a differential amplifier that includes active transistors 101 and 102, which, in the embodiment shown, are NPN bipolar devices. A biasing circuit 104 is provided to establish a constant voltage on the base of the transistor 102 to bias it to provide a constant current flow therethrough. On the other hand, a contrast control signal is derived from a user controlled voltage applied via a contrast input pin 108 to the base of the active NPN transistor 101 to control the current through the NPN transistor 101. A third NPN control transistor 104 is provided with its collector connected to the current flow path through the first NPN transistor 102 and its base connected to the current flow path through the second active transistor 101. Once the contrast circuit is tuned, there is a voltage difference between point P02 and P03. Thus, the voltages derived at the points P03 and P02 on the respective bases of active transistors 102 and 101 are of magnitude ratios established by the level of the user controlled voltage on the contrast input pin 108. As mentioned above, the points P02 and P03 are connected to the points P02 and P03 connected to the bases of the NPN transistor 64 and 63 of the differential transistor pair at the input of the red channel amplifier section 54 in FIG. 2A.

On the other hand, a color saturation control circuit 120 is provided as shown in FIG. 2B, which receives its input on a color saturation control input terminal 121. The color saturation control circuit 120 is constructed in a manner similar to the contrast control circuit 100 described above, and includes a differential amplifier having NPN transistors 123 and 124 defining respective current flow paths therethrough. A biasing circuit 125 provides an essentially constant bias on the base of the active transistor 123. On the other hand, the externally generated user controlled color saturation control signal on the pin 121 is connected to control the current in the current flow path through the second active NPN transistor 124. An NPN control transistor 130 is connected with its collector connected to the current flow path through the transistor 123 at its base connected to the current flow path through the second active transistor 124.

Thus, in operation, the signals that are developed upon the terminals P1 and P2 at the respective bases of active NPN transistors 123 and 124 have magnitudes that have a ratio dependent upon the value of the voltage applied to the color saturation control signal input pin 121. The points P1 and P2, as described above, are connected to points P2 and P3 at the bases of the amplifier transistors 91 and 92 in the circuit 80 that develops the combined and weighted white level signal that is added to the red channel signal developed in the red channel 54 also described above in detail.

The user controlled color saturation control signal that on the color saturation input pin 121 is also connected to an inverter circuit 135, shown in the contrast control circuit portion 100 described above. The color saturation control signal level is adjusted by a voltage divider at the input to the inverting transistor 136, having a current flow path connected to the current flow path through the active transistor 101. It will therefore be seen that in operation the relative ratios of the magnitudes of the signals developed on the output points P1 and P2 with respect to the relative ratios of the signals developed on the output points P02 and P03 are inversely proportional.

Thus, in the operation of the circuit 50, the overall gain that is seen by the video signal on the red input terminal 60 is constant, with the white level being adjusted according to the voltage on the color saturation input pin 121, and with the contrast being adjusted in proportion to the voltage on the contrast voltage input pin 108 and in inverse proportion to the voltage applied to the color saturation input pin 121. Again, the green and blue channels in the circuit 50 are similarly constructed with similar connections to the signal summing, averaging, and weighting circuit 80 and the contrast and color saturation circuits 100 and 120.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A preamplifier for providing color video signals for application to a color monitor, comprising:

a summing circuit connected to combine respective individual color video signals to provide a combined output video signal;

a plurality of amplifier channels, each connected to receive as inputs respective individual color video signals, each amplifier channel comprising a first amplifier for receiving as input one of said color video signals for producing an amplified color video signal output, and a contrast control circuit connected to control the gain of said first amplifier;

a second amplifier, connected to receive the combined output video signal from said summing circuit for producing a white level output signal, connected to be added to the amplified video signal outputs of said first amplifiers to produce respective color output signals; and a user adjustable color saturation control circuit connected to control a gain of said second amplifier, and to control the contrast control circuit inversely to the gain of said first amplifier.

2. The preamplifier circuit of claim 1 wherein the plurality of amplifier channels are three in number, connected to receive respectively red, green, and blue video signal information.

3. The preamplifier circuit of claim 1 wherein each first amplifier is a differential amplifier, and said contrast control circuit is connected to control the gain of each of said first amplifiers.

4. The preamplifier circuit of claim 1 wherein each of the amplifier channels further comprises a power amplifier connected to receive the respective color output signals for application to the color monitor.

5. The preamplifier circuit of claim 1 wherein said summing circuit sums each of the respective individual color video signals to provide the combined output video signal.

6. The preamplifier circuit of claim 1 wherein said summing circuit sums each of the respective individual color video signals to form a summed signal, and divides the summed signal by the number of respective individual color video signals to provide an averaged combined output video signal.

7. The preamplifier circuit of claim 6 wherein said color saturation control circuit is connected to adjust said contrast control circuit and said second amplifier to adjust the gains of said first and second amplifiers to produce a substantially constant combined gain.

8. An amplifier for color video signals for application to a color monitor, comprising:

a circuit connected to sum respective individual input color video signals to provide a summed output video signal;

a first amplifier for receiving one of said individual color video signals as an input and for producing an amplified individual color video signal output;

a second amplifier connected to receive the summed output video signal for producing a reference output signal, connected to be added to the amplified individual color video signal output;

a user adjustable color saturation control circuit connected to control a gain of said second amplifier, and to inversely control a gain of said first amplifier.

9. The amplifier of claim 8 further comprising a contrast control circuit connected to control the gain of said first amplifier, and wherein said user adjustable color saturation control circuit is connected to control said contrast control circuit to control the gain of said first amplifier.

10. The amplifier circuit of claim 8 further comprising a third amplifier and a fourth amplifier for respectively receiving second and third individual color video signals as inputs and for producing an amplified individual color video signal outputs.

11. The amplifier circuit of claim 10 wherein said first, second and third amplifiers are connected to receive respectively red, green, and blue video signal information.

12. The amplifier circuit of claim 10 further comprising first, second and third power amplifiers, each power amplifier connected to receive a respective color output signal.

13. The amplifier circuit of claim 8 wherein said circuit connected to sum respective individual input color video signals divides the summed signal by a number of respective individual color video signals to provide an averaged combined output video signal.

14. The amplifier circuit of claim 8 wherein said color saturation control circuit is connected to adjust said contrast control circuit and said second amplifier to adjust the gains of said first and second amplifiers to produce a substantially constant combined gain.

15. An amplifier for controlling a color saturation level of a multi-color video signal comprising:

a first amplifier for receiving one of plurality of individual color video signals as an input and for producing an amplified individual color video signal output;

a circuit connected to sum respective individual input color video signals to provide a summed output video signal;

a second amplifier connected to receive the summed output video signal for producing a reference output signal, connected to be added to the amplified individual color video signal output;

a user adjustable color saturation control circuit connected to control a gain of said second amplifier, and to inversely control a gain of said first amplifier.

16. The amplifier of claim 15 further comprising a contrast control circuit connected to control the gain of said first amplifier, and wherein said user adjustable color saturation control circuit is connected said contrast control circuit to control the gain of said first amplifier.

17. The amplifier circuit of claim 15 wherein said amplifier channel further comprises a power amplifier connected to receive the color output signals.

18. The amplifier circuit of claim 15 wherein said circuit connected to sum respective individual input color video signals divides the summed signal by a number of respective individual color video signals to provide an averaged combined output video signal.

19. The amplifier circuit of claim 15 wherein said color saturation control circuit is connected to adjust said contrast control circuit and said second amplifier to adjust the gains of said first and second amplifiers to produce a substantially constant combined gain.

20. A method for controlling a color saturation level of a multi-color video signal comprising:

amplifying one of said individual color video signals by a first gain to produce an amplified individual color video signal output;

summing individual input color video signals to provide a summed output video signal;

amplifying the summed output video signal by a second gain to produce a reference output signal;

adding the reference output signal to the amplified individual color video signal output;

inversely varying the first and second gains in dependence upon a desired color saturation level.

21. The method of claim 20 wherein said step of inversely varying the second gain comprises varying a contrast control inversely to a variance in the second gain.

22. The method of claim 20 further comprises scaling the summed signal.

23. The method of claim 22 wherein step of scaling the summed signal comprises dividing the summed signal by a number of respective individual color video signals to provide an averaged combined output video signal.

24. The method of claim 20 further comprising adjusting said first and second gains to produce a substantially constant combined gain.

* * * * *